US008154169B2

(12) United States Patent
Qin et al.

(10) Patent No.: US 8,154,169 B2
(45) Date of Patent: Apr. 10, 2012

(54) RAIL BRUSH ASSEMBLY WITH DETENT

(75) Inventors: Rui Feng Qin, Hong Kong (CN); Ting Tuan Xu, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 148 days.

(21) Appl. No.: 12/543,237

(22) Filed: Aug. 18, 2009

(65) Prior Publication Data

US 2010/0038990 A1   Feb. 18, 2010

(30) Foreign Application Priority Data

Aug. 18, 2008   (CN) .......................... 2008 1 0142386

(51) Int. Cl.
*H01R 39/38*   (2006.01)
*H01R 39/40*   (2006.01)

(52) U.S. Cl. ........ 310/242; 310/239; 310/245; 310/246; 310/247

(58) Field of Classification Search .................. 310/239, 310/242, 248, 240, 244–246, 247
See application file for complete search history.

(56) References Cited

U.S. PATENT DOCUMENTS

| 3,067,318 | A | * | 12/1962 | Hanes | 219/85.15 |
| 3,784,856 | A | * | 1/1974 | Preston | 310/239 |
| 3,955,113 | A | * | 5/1976 | Hillyer et al. | 310/245 |
| 2004/0183394 | A1 | * | 9/2004 | Kwan Ko et al. | 310/239 |
| 2005/0225198 | A1 | * | 10/2005 | Simofi-Ilyers et al. | 310/264 |

FOREIGN PATENT DOCUMENTS

| CN | 1601827 A | * | 3/2005 |
| EP | 1592112 B1 | | 11/2007 |
| JP | 07336957 A | * | 12/1995 |

OTHER PUBLICATIONS

Machine Translation JP07336957 (1995).*

* cited by examiner

*Primary Examiner* — Quyen Leung
*Assistant Examiner* — Jose Gonzalez Quinones
(74) *Attorney, Agent, or Firm* — Muncy, Geissler, Olds & Lowe, PLLC

(57) ABSTRACT

A rail brush assembly for an electric motor having a commutator, comprises a brush, a spring, a pair of rails and at least one detent for retaining the brush on the rails. The brush has a groove on each of a pair of opposite sides. The rails are disposed in the grooves for guiding the brush to the commutator with the brush being freely slidable along the rails within a predetermined range of motion. The spring is arranged to urge the brush along the rails towards the commutator of the motor and is attached to an end of the brush remote from the commutator. The detent is formed between the spring and at least one rail to limit the range of movement of the brush along the rails.

15 Claims, 4 Drawing Sheets

RAIL BRUSH ASSEMBLY WITH DETENT

CROSS REFERENCE TO RELATED APPLICATIONS

This non-provisional patent application claims priority under 35 U.S.C. §119(a) from Patent Application No. 200810142386.4 filed in The People's Republic of China on Aug. 18, 2008.

FIELD OF THE INVENTION

This invention relates to an electric motor and in particular, to a rail guided brush assembly for an electric motor, especially for a PMDC motor.

BACKGROUND OF THE INVENTION

Rail guided brush assemblies are known, see for example, EP1592112. Rail brush assemblies comprise a pair of rails and a brush having two grooves on opposite sides thereof. The brush slides along the rails towards the commutator of the motor urged by a spring and captured by the rails being located within the grooves.

One problem with this arrangement is that at end of life, the brushes can dislodge from the rails and cause a short circuit within the motor which could lead to catastrophic failure.

SUMMARY OF THE INVENTION

Hence there is a desire for an electric motor having a guided brush assembly in which, at end of life, the brush, when worn out (reaches end of useful life), remains captured within the brush guidance system.

This is achieved in the present invention by using a rail brush guidance system in which there is a detent mechanism between the rail and the brush spring to prevent the brush from being released from the rails even when the brush has reached the end of its useful life (worn out).

Accordingly, in one aspect thereof, the present invention provides a rail brush assembly for an electric motor having a commutator, comprising: a brush, having a groove on each of a pair of opposite sides thereof; a pair of rails disposed in the grooves for guiding the brush to the commutator, the brush being freely slidable along the rails within a predetermined range of motion; a spring arranged to urge the brush along the rails towards the commutator, the spring engaging an end of the brush remote from the commutator; and a detent between the spring and at least one rail to limit the range of movement of the brush along the rails under the urgings of the spring.

Preferably, the detent is a feature of the at least one rail which engages an end of the spring.

Preferably, the feature is a projection formed on the at least one rail.

Preferably, the projection is a coined portion of the at least one rail.

Preferably, the feature is a deformed distal end portion of the at least one rail.

Alternatively, the feature may be a bent and folded distal end portion of the at least one rail.

Preferably, the spring is a coil spring and a protuberance formed on said end of the brush remote from the commutator forms a seat for the spring.

Preferably, the brush has a shunt for connecting the brush to electrical power and the shunt extends from the brush through the protuberance.

Preferably, the shunt is lead away from the spring by a recess formed in a side of the protuberance.

Preferably, the grooves extend through the protuberance.

Preferably, the spring resiliently grips the protruberance.

According to a second aspect thereof, the present invention provides an electric motor incorporating a rail brush assembly as defined above.

Preferably, the motor has four brush assemblies.

Preferably, the brush assemblies are carried by a brush card.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
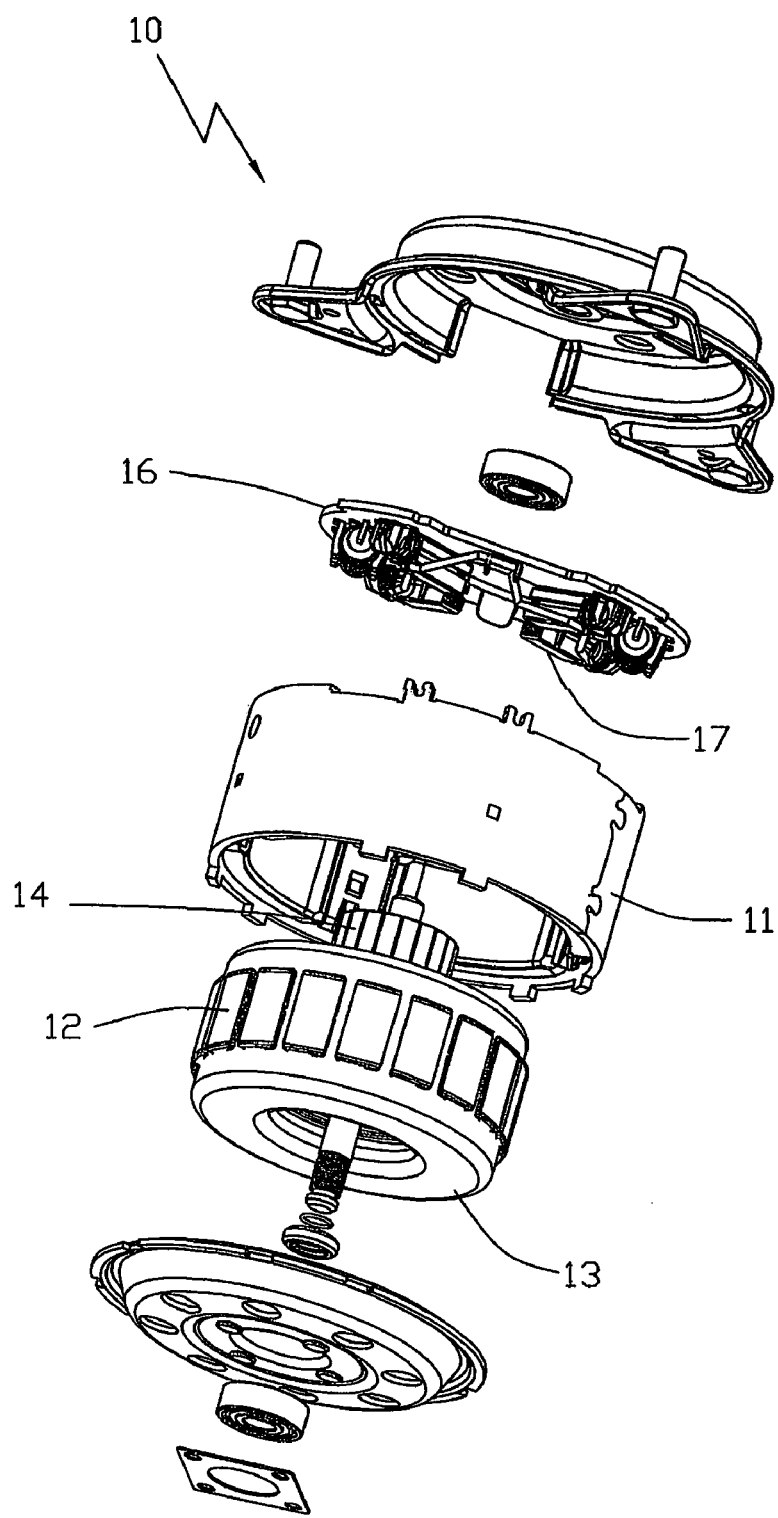
FIG. 1 is an exploded view of a PMDC motor, according to a preferred embodiment of the present invention.

The motor 10 of FIG. 1 is a PMDC motor shown in exploded form. The motor 10 has a permanent magnet stator 11, a wound rotor 12 including rotor windings 13 and a commutator 14 and brush gear for transferring electrical power from the motor terminations (not shown) to the rotor windings via the commutator. The brush gear includes a brush card 16 supporting a plurality of brush assemblies 17. The brush assemblies 17 each comprise a brush 20, a guidance system in the form of rails for guiding the brush to the commutator and a spring for resiliently urging the brush along the rails and into contact with the commutator. End brackets and bearings are also shown.

Figure 2:
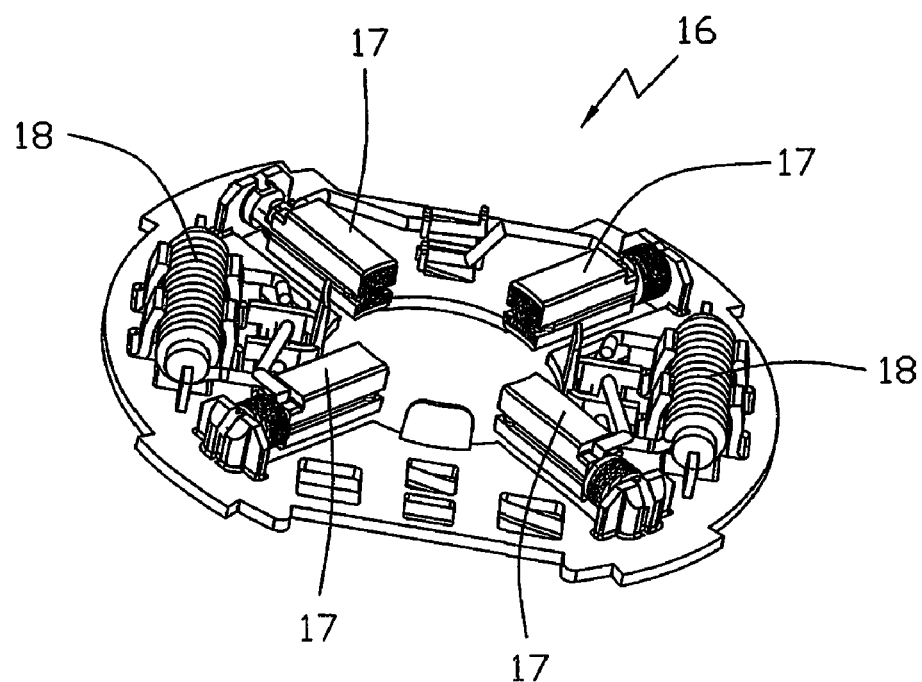
FIG. 2 is a perspective view of a brush card, being a part of the motor of FIG. 1.
Figure 3:
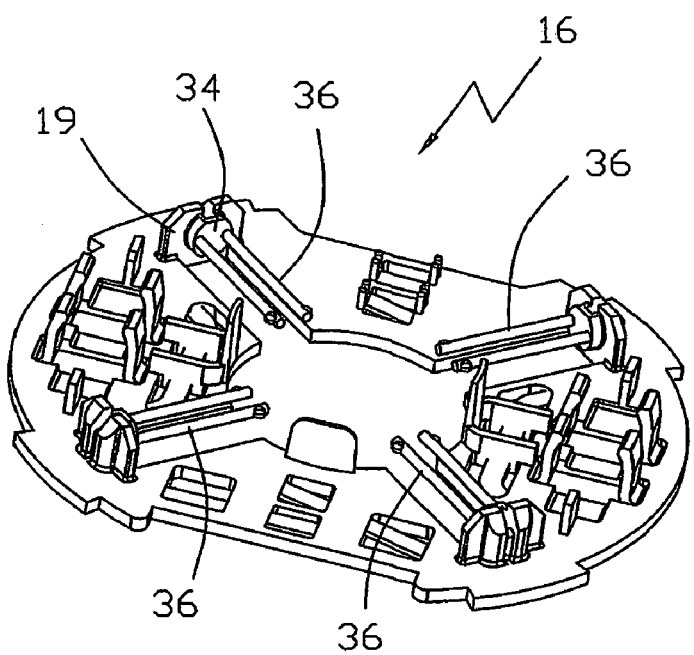
FIG. 3 is a perspective view of a rail brush assembly, being a part of the brush card of FIG. 2.

FIGS. 2 & 3 illustrate the brush card 16. In this embodiment, the brush card supports four brush assemblies 17. The brush card 16 also supports other components for the motor, such as noise suppression components represented by chokes 18. FIG. 3 shows the brush card 16 without the brushes and other components to illustrate the brush guidance system. The brush card 16 is a plastics material moulded part and the rails are fixed to the brush card by being moulded into the brush card.

Figure 4:
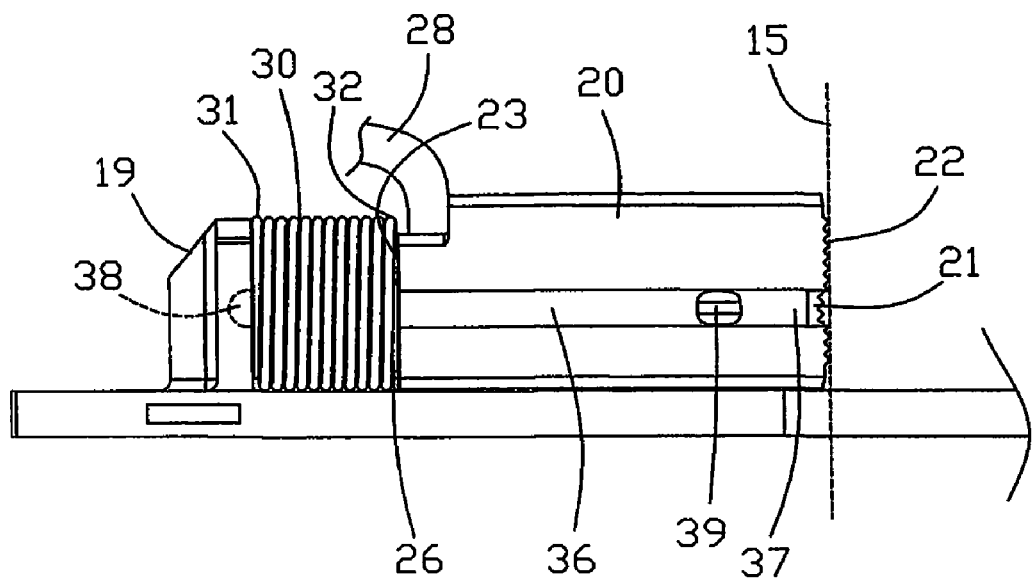
FIG. 4 is an enlarged view of a rail brush assembly of the brush card of FIG. 2.

FIG. 4 illustrates one of the rail brush assemblies 17, broken away from the brush card 16. The brush assemblies are essentially identical in construction and thus only one brush assembly will be described in detail. The brush assembly 17 comprises the brush 20, the spring 30 and the guidance system. The brush 20 is a carbon based mass of a generally rectangular prism shape having a first face 22 adapted to make sliding contact with the commutator, a second face 23 opposite the first face adapted to engage the spring 30 and supporting an embedded shunt 28 for connecting the brush 20 to the electrical power. The brush 20 has four sides 24 extending between the first face 22 and the second face 23. Two opposite sides each have a groove 21 extending from the first face 22 to the second face 23. The grooves 21 engage the guidance system.

The spring 30 is a coil spring having a first end 31 and a second end 32. The first end is arranged in use to bear against a spring seat 34 formed on a wall 19 of the brush card 16. The second end 32 is adapted to engage the second face 23 of the brush 20 to urge the brush away from the spring seat 34. The second face 23 of the brush 20 is formed with a protuberance 26 having a cylindrical form and through which the grooves 21 extend. The protuberance 26 forms a seat for the spring 30 and optionally, the spring 30 is fixed to the protuberance 26 as a tight fit, i.e. the spring 30 is resiliently sprung to engage the protuberance 26 and thus resiliently grips the protuberance 26, firmly attaching the spring 30 to the brush 20. The brush shunt 28 may be attached to the brush 20 in the axial direction or in the lateral direction. If attached in the lateral direction, it is desirable for the shunt 28 to be attached inboard of the protuberance 26 to avoid interfering with the connection between the spring 30 and the protuberance 26. However, it is preferred that the shunt 28 be attached in the axial direction, extending into the brush 20 through the protuberance 26. To facilitate the attachment of the spring 30, the protuberance 26 has a recess 29 for leading the shunt 28 away from the spring 30 without interfering with the attachment of the spring 30 to the brush 20.

The guidance system is in the form of a pair of rails 36 extending in a generally parallel manner with a predetermined gap there between. By generally parallel we mean parallel or close to parallel as it may be advantageous for the rails 36 to be slightly convergent so as to grip the brush 20 more tightly at the distal end 37 of the rails 36 to take into account variations in the distance between the grooves and in particular manufacturing tolerances in the brush and in the rails. The rails 36 are preferably formed by a single rod bent into a U-shape with the base 38 of the U being fixed to the brush card by overmoulding (i.e. by having the brush card moulded over and about the base to securely fix the base to the brush card). However, other methods of fixing the rails to the brush card, such as by being pressed into apertures in the brush card.

The brush 20 is captured by the guidance system by the rails 36 being located in the grooves 21 of the brush 20. Thus the brush 20 is able to slide freely along the rails 36 under the urging of the spring 30, but is unable to move in other directions. As will be appreciated, as the grooves 21 for the rails 36 extend through the protuberance 26, the spring 30 is located about the rails 36 and thus the rails 36 also guide the spring 30 and prevent it from sagging or buckling when compressed. In use, the spring 30 presses the brush 20 into contact with the edge of the commutator, represented by line 15, within the limits of allowable moment of the brush along the rails.

To prevent the brush 20 from being dislodged from the rails, especially at end of life when the brush 20 is worn out, a detent mechanism is provided. The detent mechanism comprises a detent formed on the rails 36 which engage the spring 30 when the brush 20 reaches end of travel. End of travel is that position which the second face 23 of the brush 20 reaches when the brush 20 is worn out in use. At end of travel, the detents engage the spring 30 to prevent the spring from extending any further, thereby preventing the spring from pressing the brush against the commutator. As the brush 20 continues to wear a gap is formed between the brush 20 and the commutator, resulting in an open circuit preventing further operation of the motor. As the spring 30 is firmly fixed to second end 23 of the brush 22, the brush remains captured within the rails 36. The extension of the grooves 21 through the protuberance 26 provides a longer guidance path resulting in either better guidance of the brush 20 (more stable positioning of the brush) or allowing the brush to be worn down further before being considered worn out and in danger of being dislodged from the rails 36.

Figure 7:
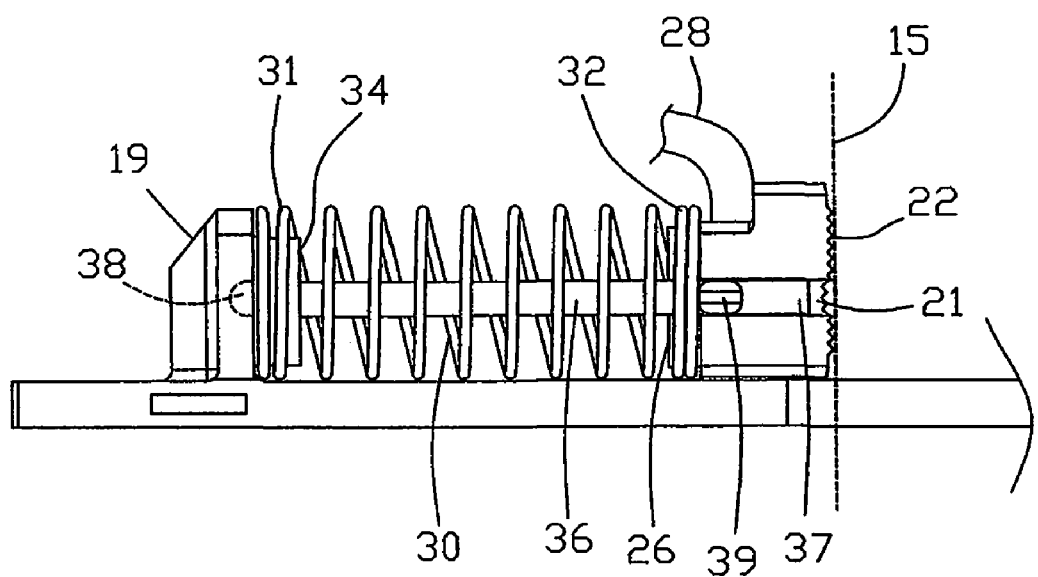
FIG. 7 is a perspective view of the rail brush assembly of FIG. 3, when worn out.
Figure 5:
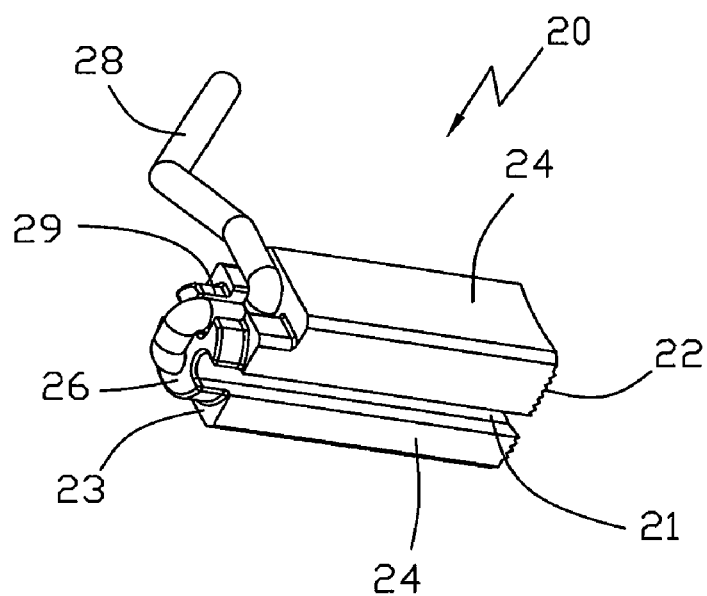
FIG. 5 is a enlarged view of a brush of the rail brush assembly of FIG. 4.
Figure 6:
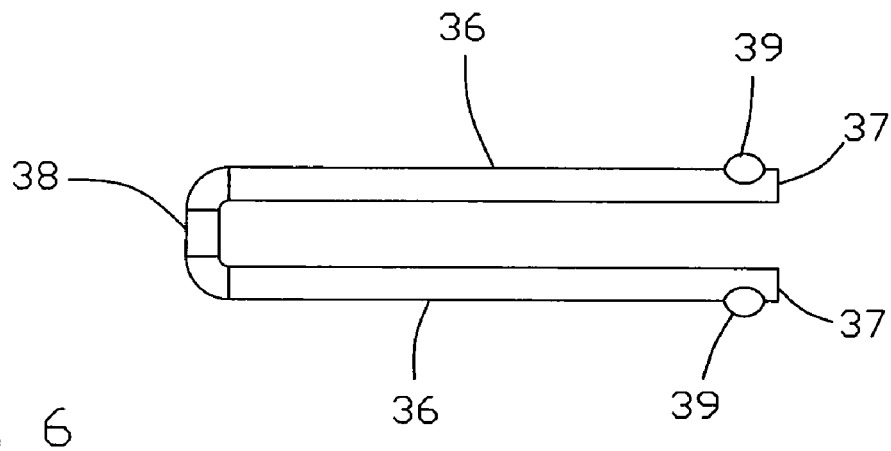
FIG. 6 is a view of a rail assembly of the rail brush assembly of FIG. 4.

The detent mechanism, in the preferred form is a simple coining of the edge of each rail 36 adjacent the distal end 37 thereof at a location corresponding to the location of the second end 23 of the spring 30 at end of travel. This coining produces a projection 39 to be formed on the outer portion of the rails 36 sufficiently large to prevent further movement of the spring 30 along the rails 36. FIG. 7 shows a brush assembly 17 similar to that of FIG. 4 except that the brush 20 has been worn down to its serviceable limit and is thus considered worn out. At this position, the so called end of life position, the second end 32 of the spring engages the projection 39 prevent the spring 30 from continuing to urge the brush 20 towards the edge of the commutator 15 and out from between the rails 36. Alternative designs considered to be effective but not as simple, may include bending of the rails, particularly a bending out or a bending and folding back of the distal end of the rails to cause an increase in the outside width across the rails.

Thus a simple modification to the rails of a rail brush assembly prevents the brush from being dislodged from the rails at end of life which otherwise could lead to a short circuit within the motor and catastrophic failure.

Figure 8:
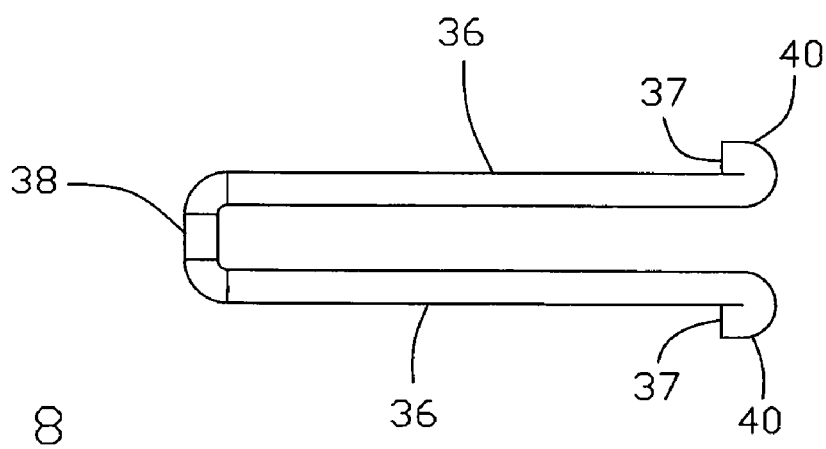
FIG. 8 is a view similar to FIG. 6 of an alternative rail assembly.

FIG. 8 illustrates an alternative detent between the rails and the spring. In this embodiment, the detent is created by turning out the ends 37 of the rail. The ends may be turned out by simply bending the ends or by bending and folding the ends so that the end portions 40 of the rails 36 lay substantially parallel to the arms of the rails. While bent end portion or portions will suffice, bend and folded end portions are preferred for ease of assembly.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow. For example, while the detent has been described and shown as being formed on both rails, it may be formed on only one of the rails.

Also, while the preferred embodiment refers to the spring as being tightly fixed to the brush, it may simple engage the end of the brush in a firm or even loose manner, guided by the protuberance acting as a seat for the spring. In this manner, the brush, at end of life, still remains captured by the rails as the brush is no longer urged against the commutator and thus remains too large to escape the rails through the gap between the ends of the rails and the commutator. Because the spring is no longer pressing the brush against the commutator, the motor will not continue to operate properly and the brush will not continue to be worn down by the commutator, to the extent that the brush can be dislodged from the rails.

The invention claimed is:

1. A rail brush assembly for an electric motor having a commutator, comprising:
   a brush, having a groove on each of a pair of opposite sides thereof;
   a pair of rails disposed in the grooves, the brush being guided to the commutator essentially by the rails, the brush being freely slidable along the rails within a predetermined range of motion;
   a spring arranged to urge the brush along the rails towards the commutator, the spring gripping a protuberance formed on an end of the brush remote from the commutator; and
   a detent between the spring and at least one rail to limit the range of movement of the brush along the rails under the urging of the spring,
wherein the spring is a coil spring and the rails extend longitudinally through the spring and the grooves extend through the protuberance.

2. The brush assembly of claim 1, wherein the detent is a feature of the at least one rail which engages an end of the spring.

3. The brush assembly of claim 2, wherein the feature is a projection formed on the at least one rail.

4. The brush assembly of claim 3, wherein the projection is a coined portion of the at least one rail.

5. The brush assembly of claim 2, wherein the feature is a deformed distal end portion of the at least one rail.

6. The brush assembly of claim 2, wherein the feature is a bent and folded distal end portion of the at least one rail.

7. The brush assembly of claim 1, wherein the brush has a shunt for connecting the brush to electrical power and the shunt extends from the brush through the protuberance.

8. The brush assembly of claim 7, wherein the shunt is lead away from the spring by a recess formed in the side of the protuberance.

9. An electric motor incorporating the rail brush assembly of claim 1.

10. The electric motor of claim 9, wherein the motor has four brush assemblies.

11. The electric motor of claim 10, wherein the brush assemblies are carried by a brush card.

12. The electric motor of claim 9, wherein the detent is a feature of the at least one rail which engages an end of the spring.

13. The electric motor of claim 12, wherein the feature is a projection formed on the at least one rail.

14. The electric motor of claim 13, wherein the projection is a coined portion of the at least one rail.

15. The electric motor of claim 12, wherein the feature is a bent and folded distal end portion of the at least one rail.

* * * * *